(No Model.) 2 Sheets—Sheet 1.
D. JOHNSON.
GRASS RECEIVER FOR LAWN MOWERS.
No. 429,629. Patented June 10, 1890.
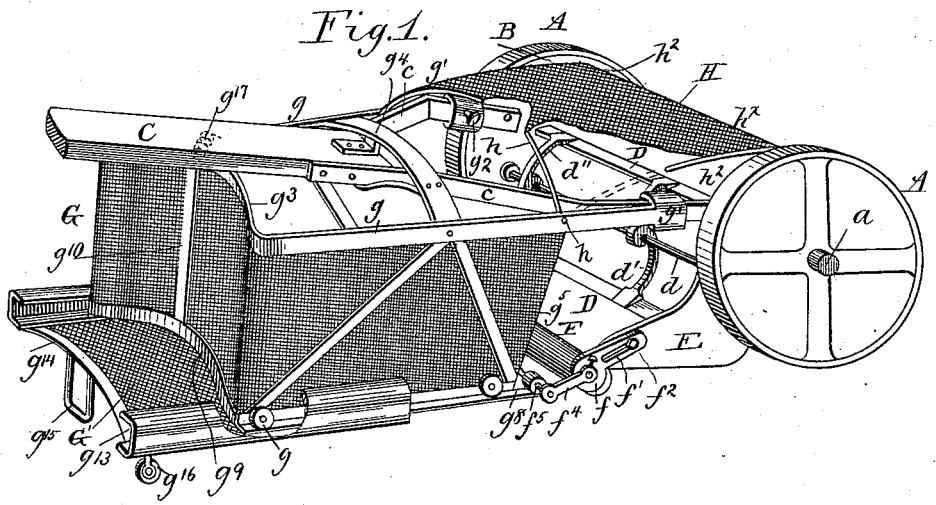
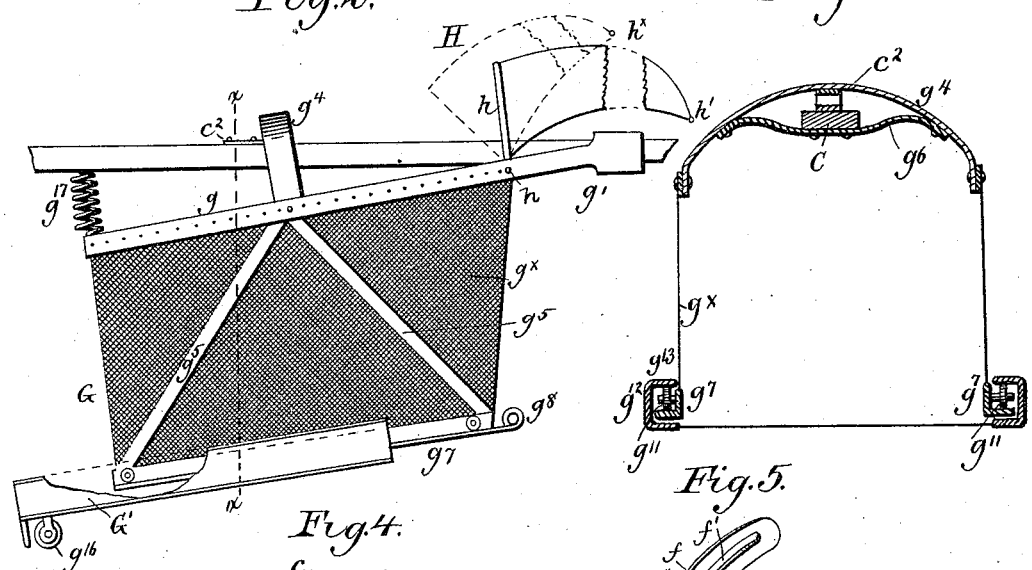
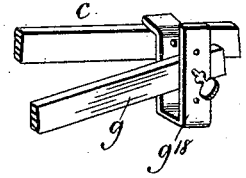
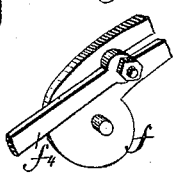
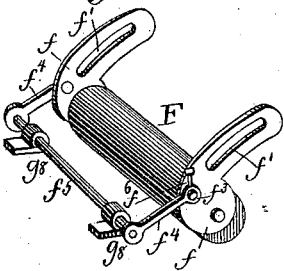
Witnesses
F. G. Fischer
S. L. C. Hasson
Inventor
Daniel Johnson
per Rich'd H. Manning Atty (No Model.) 2 Sheets—Sheet 2.
D. JOHNSON.
GRASS RECEIVER FOR LAWN MOWERS.
No. 429,629. Patented June 10, 1890.
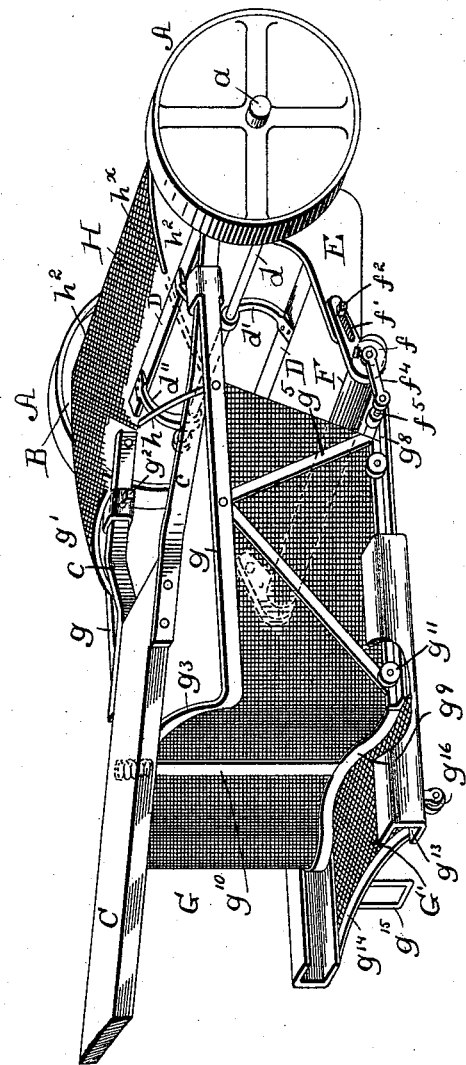
Witnesses:
F. G. Fischer
S. L. C. Hasson
Inventor:
Daniel Johnson
By Rich. H. Manning Atty.

UNITED STATES PATENT OFFICE.

DANIEL JOHNSON, OF KANSAS CITY, MISSOURI.

GRASS-RECEIVER FOR LAWN-MOWERS.

SPECIFICATION forming part of Letters Patent No. 429,629, dated June 10, 1890.

Application filed May 29, 1888. Serial No. 275,514. (No model.)

*To all whom it may concern:*

Be it known that I, DANIEL JOHNSON, a citizen of the United States, residing at Kansas City, in the county of Jackson and State of Missouri, have invented certain new and useful Improvements in Grass-Receivers for Lawn-Mowers; and I do hereby declare that the following is a full, clear, and exact description of the invention, which will enable others skilled in the art to which it appertains to make and use the same, reference being had to the accompanying drawings, forming a part of this specification.

My invention relates to grass-receivers for lawn-mowers, and is an improvement upon the invention for which an application for Letters Patent of the United States was filed by me in the United States Patent Office on the 16th day of September, A. D. 1887, Serial No. 249,846; and it consists in the means for suspending the receiver from the mower-handle and enabling the weight of the receiver to be equally distributed.

It also consists in the novel construction and combination of parts which will first be fully described, and then specifically pointed out in the claims.

Figure 1 is a perspective view of a lawn-mower, showing the receiver attached in the rear thereto and supported by the handle of the mower, and also showing the sliding bottom with a portion of the guide partially removed to show the rollers, and also showing the hinged shield covering the cutters partially broken away. Fig. 2 is a side view of the receiver, shown attached to a portion of the handle of the mower and the spring connecting the handle to the receiver. Fig. 3 is a transverse sectional view of the receiver, taken on the line $x\,x$, Fig. 2. Fig. 4 is a detail view of an alternate form of support, connecting the end of the receiver with the handle of the mower. Fig. 5 is a detail perspective view of the feed-roller, the connecting-rod, and the angle-irons of the receiver. Fig. 6 is a detail view of the lower end portion of the adjustable feed-roller bracket, showing the slot and a portion of the rod-supporting arm adjustably connected with the bracket. Fig. 7 is a perspective view of the lawn-mower and receiver, showing the receiver connected without the transverse support.

Similar letters of reference indicate corresponding parts in all the figures.

A A represent the traction-wheels of a lawn-mower mounted fixedly on the shaft $a$.

B B are concentric plates, which fit within the overlapping flanges of the wheels A A on the inner side, and are loosely mounted on the shaft $a$.

C is the handle of the mower and $c\,c$ the forked ends of the handle, which are respectively attached at their extreme ends at a point slightly above the cutters to the sides of the plates B B.

$d$ is the transverse cutter-shaft, which is journaled at opposite ends in suitable perforations in the plates B B, and upon which shaft is attached the radial arms $d'\,d''$, and upon said arms are the horizontal cutters D D. The extreme opposite ends of the cutter-shaft $d$ connect with internal annular cog-wheels. (Not shown on the drawings, and for the purpose of the invention not deemed necessary to illustrate.) Said cog-wheels are between the wheel and plate B. By means of said wheels the power is derived which rotates the cutter-shaft and cutters D D thereon, as the power is applied to handle C to push the same forward and rotate the wheels A A.

E E are the side frames of the mower, which are attached to the side plates B B in opposite relation to each other, and extend downwardly and rearwardly the proper distance toward the ground on the side of and beneath the forked ends of the handle C.

Upon the outer side and extending beyond the ends of frames E are adjustably connected the feed-roller brackets $f\,f$, which are provided with a slot $f'$ in one end, which slot receives a suitable bolt on the side of frame E, and is held adjustably at the proper distance by a nut $f^2$. In the opposite ends of the bracket $f\,f$ are journaled the respective opposite journals of the feed-roller F, so that as the brackets $f\,f$ are adjusted the proper distance above the ground, the feed-roller is also elevated to regulate the relative elevation or depression of the cutter and the height of cut upon the standing grass.

Upon the outer sides of the brackets $f$, at a point above the journals of the feed-roller F, are cast upon or attached thereto the pins $f^3$. Two short arms $f^4\,f^4$ are then made, which are perforated transversely in a transverse relation at opposite ends, and one end of each arm is fitted to turn on the pins $f^3 f^3$, the opposite end extending a short distance from the brackets $f f$, for the purpose hereinafter described.

In the opposite ends of the arms $f^4 f^4$, parallel with the feed-roller F, is journaled a rod $f^5$. To adjust the rod $f^5$ in an upward or downward direction, a screw-threaded perforation is made in the arm $f^4$ at the point connected with pin $f^3$ and in a line radially to said pin, and in said perforations is then inserted a thumb-screw $f^6$, which impinges on the pin $f^3$.

When the mower is advanced to cut the grass, the cutter D throws the fine particles rearward and in a slightly upward direction.

For the purpose of preventing the cut grass from falling upon the ground and there decaying, a receiver G is made as follows: From suitable material is made two longitudinal flat strips $g g$, narrow in width. Upon one end of each strip $g g$, extending transversely from the upper and lower edges, are formed the sleeves $g' g'$. The strips $g g$ are placed in a substantially horizontal relation against the respective outer sides of the forked ends $c c$ of the handle C, and near the connection of said forked ends $c c$ with the plates B B, the sleeves $g' g'$ extending around the inner side of forked ends $c c$. A screw-threaded perforation is then made transverse to the strip $g$ through the sleeves $g' g'$, and a thumb-screw $g^2$ inserted therein, thus screwing one end of the strip removably to the forked end of the handle. The strips $g g$ extend rearwardly from their point of connection the distance required for the proper length of the receiver, and are connected together by means of a transverse strip $g^3$, which is curved inwardly from its point of connection with the said strip $g g$. To support the strip $g g$ between its opposite ends is an angle-plate $c^2$, one side of which is attached by screws to the end of the handle C, upon the upper side near the point of connection of the forked ends $c c$, the opposite side projecting in an upward direction from the handle C. A flat supporting-strip $g^4$ is then made of the proper length and width and bent centrally in a curved upward direction, and between its opposite ends rested transversely upon the handle C upon the top edge of the projecting angle-plate $c^2$, the ends of which strip extend to the inner sides of the strips $g g$, and are then secured to said strips by suitable rivets. From the point of attachment of the strip $g^4$ to the sides of the strips $g g$ two longitudinal strips $g^5 g^5$ extend in a downward direction, which are spread apart at the lower ends in opposite directions, one end toward the feed-roller F and the opposite end at a like angle toward the rear lower end of the receiver. To give additional sustaining strength to the curved strip $g^4$, a spring-plate $g^6$ is attached transversely to the under side of the handle C, beneath the strip $g^4$, the ends of which are directed in an upward direction and connected by rivets to the said plate $g^4$. The strip $g^4$ and plate $g^6$ form an intermediate support for the receiver.

Beneath the strip $g g$, in a line parallel therewith, and on one side attached by rivets to the lower end of the strips $g^5 g^5$, are angle-plates $g^7 g^7$. One flat end of each plate at $g^8$ is looped around the rod $f^5$ and the opposite ends extended to a point vertically below the connecting-point of the strips $g g^3$, the lower horizontal side of the angle-plate extending in an outward direction, for the purpose hereinafter described. The ends of the angle-plates $g^7 g^7$, opposite to those attached to the rod $f^5$, are connected together by means of a curved strip $g^9$, rigidly attached thereto and extending inwardly a corresponding distance to the strip $g^3$.

The side of the receiver is covered, preferably, with woven-wire netting $g^x$, which is first attached to the vertical side of the angle-iron $g^7$ at its point of connection with rod $f^5$, and extended in an upward vertical direction from the strip $g^7$ and strip $g^9$ until it joins the strips $g$ and $g^3$. The wire is thus continued in one woven piece from the said rod $f^5$ around the end of the receiver and within the conformations of the curved strips $g^3 g^9$, and continued around the opposite side of receiver G in a like manner to the rod $f^5$, the end of the receiver G toward the cutter being open. Other material may be substituted for the wire, if preferred. The strips $g^3 g^9$ are connected within the curved end of the receiver by means of a vertical strip $g^{10}$, riveted thereto on the inner sides.

For the purpose of dumping the contents of the receiver, a sliding bottom G' is made, which is constructed as follows: Two longitudinal U-shaped guides $g^{12}$ are each made the corresponding length of an angle-iron or plate $g^7$ for the opposite sides of the receiver. The opposite ends of the U-shaped guides are connected rigidly together by means of transverse flat end strips $g^{14}$, the rear end strip $g^{14}$ only for the purpose of the invention being shown, it being curved to conform to the curve in the described end of the receiver. Extending from one strip $g^{12}$ to the other, and between the strips $g^{14}$, is attached a covering of woven-wire netting, which is soldered to the strips or woven through like perforation, as is shown in the sides of strips $g g$ in Fig. 2, if preferred.

To enable the bottom G' to be operated to and fro without friction, the opposite flanges of the U-shaped guides $g^{12}$ are made a distance apart exceeding the width of the vertical side of angle-plate $g^7$, so that when the lower horizontal flange is brought upwardly and nearly to the lower side portion of the angle-plate $g^7$ from beneath the flange $g^{13}$ extends in the direction of and a slight distance above the vertical portion of said angle-plates $g^7 g^7$. At opposite ends of each respective plate is pivotally attached to the vertical portion of said angle-plates the rollers $g^{11}$ $g^{11}$, upon which rollers rests the flange $g^{13}$ of the U-shaped guides $g^{12}$ $g^{12}$.

To the strip $g^{14}$ is rigidly attached a dependent foot-stirrup $g^{15}$, for the purpose hereinafter described. To the under side portion of the guides $g^{12}$ $g^{12}$ is attached on the end near strip $g^{14}$ the roller $g^{16}$.

To prevent the strain incident to a full load in the receiver a coiled spring $g^{17}$ is secured at one end to the end of the receiver at the point of connection of the strip $g^{10}$ with the strip $g^{3}$, the opposite terminal end extending through the handle C at a point vertically above the strip $g^{10}$, and said terminal end of the spring is upset or secured to the top portion of the handle C in any desired manner. A shield H is then made, consisting of two rods $h$ $h'$, which are connected the proper distance apart by end rods $h^{2}$ $h^{2}$. The rod $h$ extends through the strip $g$ on one side of the receiver near the point of beginning of the wire-netting, and is pivoted in a corresponding relation to the opposite strip $g$. The shield H is extended so far over the cutters as to prevent the wind from dispersing the small particles of cut grass. Extending from one to an opposite rod $h$ $h'$ and from rod $h^{2}$ to a corresponding opposite end rod and attached in any suitable manner thereto is a continuous net $h^{\times}$ of woven wire.

In Fig. 4 I have shown an alternate form of attaching the ends of the strips $g$ $g$ to the forked handle C. A hanger $g^{18}$ is shown, one end of which is wrapped around the side of the said forked end $c$, and the hooked portion on the outer side is provided with transverse perforations, through which a thumb-screw is inserted, which also passes through the strip $g$, the perforations being made one above another, so that the ends of the strips $g$ $g$ may be adjusted up or down, as the necessity requires.

I have also shown in Fig. 6 an alternate form of connecting the adjustable arm $f^{4}$ to the bracket $f$, in which the end of the arm is extended to a point opposite the slot $f'$ and the said arm connected to the bracket by means of a threaded bolt which passes through the slot $f'$, and is provided with a nut, so that the arm may be extended by adjusting the bolt within the said slot.

In the operation of the mower, when the grass thrown by the cutters has accumulated in the receiver to an extent necessitating removal, the handle C is lowered and the foot placed in stirrup $g^{15}$, the rollers $g^{16}$ resting upon the ground. The handle C of the mower is then pushed forward and the bottom is drawn out the proper distance to dump the contents of the receiver. The side rods $h^{2}$ of shield H when said shield is turned over and covering the cutters rests upon the forked ends $c$ $c$ of the handle C, and said shield may be turned back upon its pivot, as seen in dotted lines, Fig. 2.

The receiver and shield are readily attached to and detached from the mower and for the purpose of connecting the upper portion of the receiver adjustably with the forked ends of the handle the strip $g^{4}$ is dispensed with and the weight of the receiver borne by the spring shown connected with the handle of the mower.

Having fully described my invention, what I now claim as new, and desire to secure by Letters Patent, is—

1. In a lawn-mower, the combination, with the handle having forked ends, and the feed-roller brackets, of a grass-receiver, having the upper portion adjustably attached to said forked ends of said handle and the lower portion attached adjustably to said feed-roller brackets, for the purpose described.

2. In a lawn-mower, the combination, with its handle having forked ends, of a grass-receiver attached at the forward end to said forked ends of said handle, and a spring connecting the opposite end of said receiver with the handle in rear of said forked ends, for the purpose described.

3. In a lawn-mower, the combination, with its handle having forked ends, of a grass-receiver having its side portions at one end connected with said forked ends, a spring connecting the opposite end of said receiver and said handle, and an intermediate transverse support upon said handle connected with its opposite ends at the respective opposite sides of said receiver, for the purpose described.

4. In a lawn-mower, the combination, with its handle having forked ends, of a grass-receiver, a spring connecting the end of said receiver with the handle in rear of said forked ends, and the forward end adjustably attached to said forked ends of said handle, for the purpose described.

5. In a lawn-mower, the combination, with its handle having a receiver attached thereto in rear of the cutter, of a shield pivotally attached to the sides of said receiver at one end, and extending in the direction of and over the said cutters, for the purpose described.

his
DANIEL × JOHNSON.
mark

Witnesses:
JOS. MILLER,
S. L. C. HASSON.